United States Patent
Park et al.

(10) Patent No.: US 9,091,014 B2
(45) Date of Patent: Jul. 28, 2015

(54) CLOTHING DRYER AND CONTROL METHOD THEREOF

(75) Inventors: Hee Beom Park, Anyang-si (KR); Hyung Woo Lee, Suwon-si (KR); Ja Young Kim, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 1302 days.

(21) Appl. No.: 12/926,261

(22) Filed: Nov. 4, 2010

(65) Prior Publication Data

US 2011/0162228 A1   Jul. 7, 2011

(30) Foreign Application Priority Data

Jan. 6, 2010   (KR) .................. 10-2010-0000939

(51) Int. Cl.
*D06F 58/20*   (2006.01)
*D06F 58/28*   (2006.01)

(52) U.S. Cl.
CPC .............. *D06F 58/203* (2013.01); *D06F 58/20* (2013.01); *D06F 58/28* (2013.01); *D06F 2058/289* (2013.01); *D06F 2058/2819* (2013.01); *D06F 2058/2829* (2013.01)

(58) Field of Classification Search
CPC . D06F 58/04; D06F 58/10; D06F 2058/2819; D06F 2058/2822; D06F 2058/289; D06F 58/28; D06F 2058/2829
USPC ............................. 34/549, 553, 495, 497, 557
See application file for complete search history.

(56) References Cited

U.S. PATENT DOCUMENTS

| | | | | |
|---|---|---|---|---|
| 2004/0055176 | A1* | 3/2004 | Yang et al. ..................... | 34/549 |
| 2006/0150437 | A1* | 7/2006 | Tarnowski et al. ............. | 34/443 |
| 2009/0165331 | A1 | 7/2009 | Kim | |

FOREIGN PATENT DOCUMENTS

| | | |
|---|---|---|
| CN | 1724801 | 1/2006 |
| CN | 1727564 | 2/2006 |
| EP | 0 388 939 | 3/1990 |
| EP | 0 388 939 | 9/1990 |
| JP | 59-197297 | 11/1984 |
| JP | 59-197298 | 11/1984 |
| JP | 59-197300 | 11/1984 |
| JP | 2000-5493 | 1/2000 |

(Continued)

OTHER PUBLICATIONS

European Search Report dated May 26, 2011 issued in European Application No. 10191620.3.

(Continued)

*Primary Examiner* — Jiping Lu
(74) *Attorney, Agent, or Firm* — Staas & Halsey LLP

(57) ABSTRACT

A clothing dryer and a control method thereof that adjusts a heater capacity based on a humidity change amount (a drying rate) in a second half of a drying period to reduce power consumption without increase of drying time. The clothing dryer includes a drum to receive clothing, first and second hot air heaters, having different capacities, to supply hot air into the drum, a humidity sensor to sense internal humidity of the drum, and a controller to calculate a humidity change amount in the drum, to compare the calculated humidity change amount with a predetermined change amount, and to control only one having the relatively small capacity selected from the first and second hot air heaters to be operated when the humidity change amount is greater than the predetermined change amount.

3 Claims, 6 Drawing Sheets

(56) References Cited

FOREIGN PATENT DOCUMENTS

| KR | 10-2004-0100894 | | | 12/2004 |
|----|----|----|----|----|
| KR | 2005089343 | A | * | 9/2005 |
| WO | 2006/100643 | | | 9/2006 |
| WO | WO 2006/100643 | | | 9/2006 |
| WO | 2008/100079 | | | 8/2008 |
| WO | WO 2008/100079 | | | 8/2008 |

OTHER PUBLICATIONS

Chinese Office Action issued Apr. 3, 2014 in corresponding Chinese Patent Application No. 201010579642.3.

* cited by examiner

CLOTHING DRYER AND CONTROL METHOD THEREOF

CROSS-REFERENCE TO RELATED APPLICATIONS

This application claims the benefit of Korean Patent Application No. 2010-0000939, filed on Jan. 6, 2010 in the Korean Intellectual Property Office, the disclosure of which is incorporated herein by reference.

BACKGROUND

1. Field

Embodiments relate to a clothing dryer and a control method thereof that reduces power consumption without increasing drying time.

2. Description of the Related Art

Generally, a clothing dryer is an apparatus that supplies hot air heated by a hot air heater into a drum having clothing to be dried placed therein during the rotation of the drum to dry the clothing. The clothing dryer may be classified as an exhaust type clothing dryer in which high-temperature and high-humidity air, having passed through the drum, is discharged out of the clothing dryer or a condensing type clothing dryer in which moisture is removed from high-temperature and high-humidity air, having passed through the drum, and the air is supplied into the drum.

In the clothing dryer, the hot air heater to heat air is turned on/off based on dryness of the clothing, internal humidity of the drum, temperature of air (exhaust air) discharged from the outlet of the drum after drying the clothing, etc. However, the hot air heater is controlled to maintain a predetermined temperature period until the drying is completed, with the result that excessive energy is consumed in a second half of a drying period, thereby lowering energy efficiency.

SUMMARY

It is an aspect to provide a clothing dryer and a control method thereof that adjusts a heater capacity based on a humidity change amount (a drying rate) in a second half of a drying period to reduce power consumption.

It is another aspect to provide a clothing dryer and a control method thereof that adjusts a heater capacity in a period in which internal humidity of a drum is suddenly decreased to reduce power consumption.

Additional aspects will be set forth in part in the description which follows and, in part, will be apparent from the description, or may be learned by practice of the invention.

In accordance with one aspect, a clothing dryer includes a drum to receive clothing, a plurality of hot air heaters to supply hot air into the drum, a humidity sensor to sense internal humidity of the drum, and a controller to calculate a humidity change amount in the drum, to compare the calculated humidity change amount with a predetermined change amount, and to control one of the hot air heaters to be operated to adjust a heater capacity in a second half of a drying period when the humidity change amount is greater than the predetermined change amount.

The hot air heaters may include first and second hot air heaters having different capacities.

One of the hot air heaters may be one having the relatively small capacity selected from the first and second hot air heaters.

The controller may control both the first and second hot air heaters to be operated when the humidity change amount is not greater than the predetermined change amount.

The clothing dryer may further include a temperature sensor to sense exhaust temperature at an outlet of the drum, and the controller may control the first and second hot air heaters to be selectively operated based on the exhaust temperature when the humidity change amount is not greater than the predetermined change amount.

The controller may control both the first and second hot air heaters to be turned on/off based on the exhaust temperature.

The controller may control one of the first and second hot air heaters to be turned on and the other of the first and second hot air heaters to be turned on/off based on the exhaust temperature.

In accordance with another aspect, a clothing dryer includes a drum to receive clothing, first and second hot air heaters, having different capacities, to supply hot air into the drum, a humidity sensor to sense internal humidity of the drum, and a controller to control one of the first and second hot air heaters to be operated to adjust a heater capacity in a second half of a drying period when the internal humidity of the drum has reached a predetermined humidity range.

The predetermined humidity range may be a range in which the internal humidity of the drum starts to suddenly decrease.

The controller may control both the first and second hot air heaters to be operated when the internal humidity of the drum has not reached the predetermined humidity range.

The clothing dryer may further include a temperature sensor to sense exhaust temperature at an outlet of the drum, and the controller may control the first and second hot air heaters to be selectively operated based on the exhaust temperature when the internal humidity of the drum has not reached the predetermined humidity range.

In accordance with a further aspect, a control method of a clothing dryer including a drum and a plurality of hot air heaters to supply hot air into the drum includes determining whether a drying course has been selected, turning on/off the hot air heaters to perform a drying operation upon determining that the drying course has been selected, sensing changes in internal humidity of the drum during the drying operation, calculating a humidity change amount in the drum, and comparing the calculated humidity change amount with a predetermined change amount and controlling one of the hot air heaters to be turned on to adjust a heater capacity in a second half of a drying period when the humidity change amount is greater than the predetermined change amount.

The control method may further include sensing exhaust temperature at an outlet of the drum and controlling the first and second hot air heaters to be selectively turned on/off based on the exhaust temperature when the humidity change amount is not greater than the predetermined change amount.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
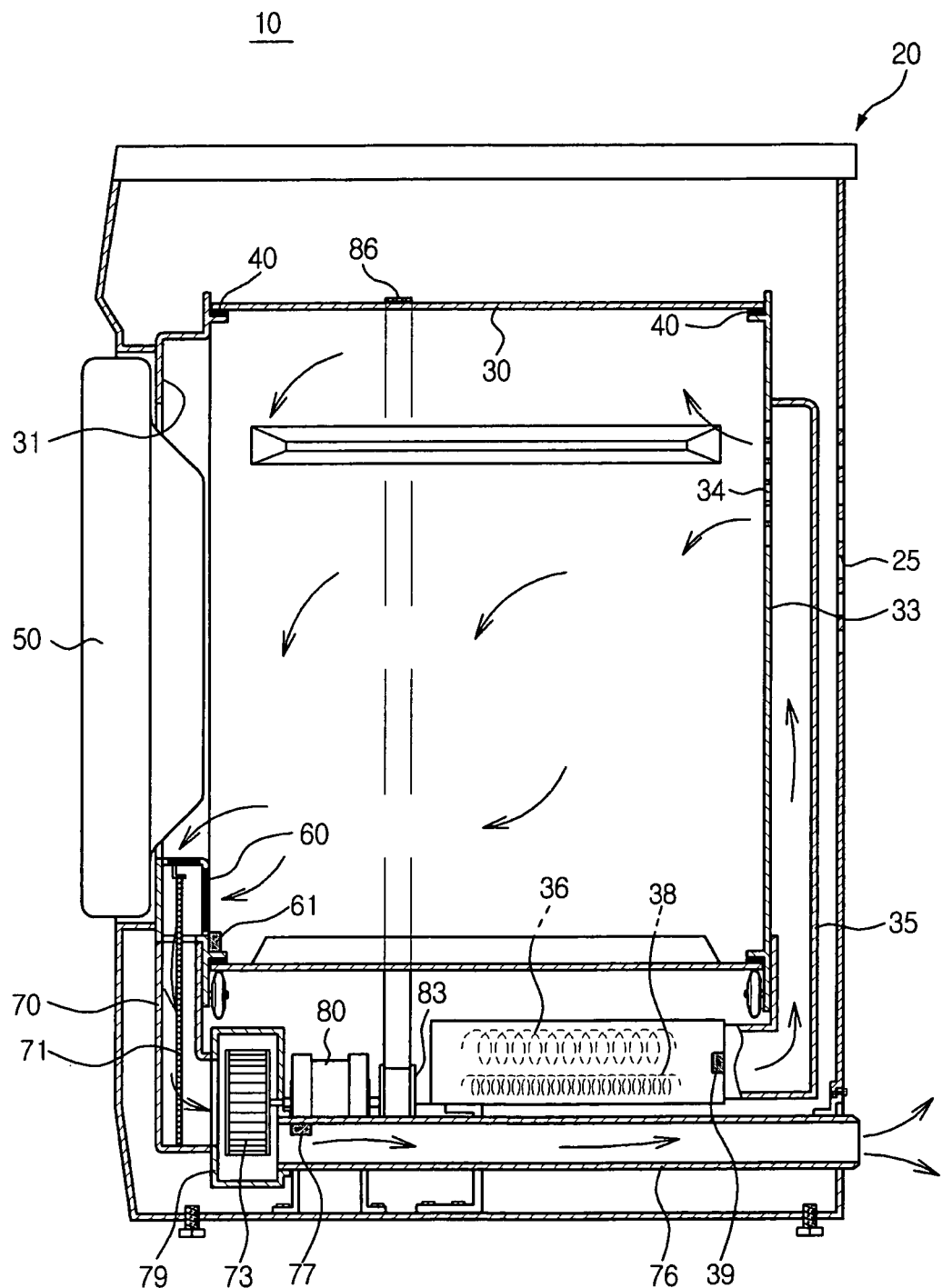
FIG. 1 is a sectional view illustrating the structure of a clothing dryer according to an embodiment.

Reference will now be made in detail to the embodiments, examples of which are illustrated in the accompanying drawings, wherein like reference numerals refer to like elements throughout.

FIG. 1 is a sectional view illustrating the structure of a clothing dryer 10 according to an embodiment.

Referring to FIG. 1, the clothing dryer 10 includes a housing 20 formed approximately in a hexahedral shape, the housing 20 having through holes 25 formed at the rear thereof to suction external air, a cylindrical drum 30 mounted in the housing 20, the cylindrical drum 30 being open at the front and rear thereof, a front bracket 31 and a rear bracket 33 to slidably support the inner circumference of the drum 30 at the front and rear ends thereof, respectively, and slide pads 40 mounted between the drum 30 and the front bracket 31 and between the drum 30 and the rear bracket 33 to assist smooth rotation of the drum 30.

The front bracket 31, mounted at the front of the drum 30, is open at the center thereof such that clothing is introduced into the drum 30 through the opening, which is closed by door 50. At the lower part of the drum 30 is formed an exhaust port 60 through which air containing moisture evaporated from the clothing is discharged to the outside.

Inside the portion of the drum 30 adjacent to the exhaust port 60 is mounted a humidity sensor 61 to sense internal humidity of the drum 30. The humidity sensor 61 contacts clothing rotated according to the rotation of the drum 30 to generate an electric signal according to the amount of moisture contained in the clothing, based on which dryness of the clothing is determined.

Below the drum 30 are mounted an exhaust duct 70, a blowing fan 73 and an exhaust pipe 76 to discharge air discharged from the exhaust port 60 out of the clothing dryer 10. In the exhaust duct 70 is mounted a filter 71 to filter impurities, such as dust or lint, contained in the air discharged from the exhaust port 60. The exhaust duct 70 guides the air discharged from the exhaust port 60 to the lower part of the housing 20. The exhaust duct 70 is connected to the blowing fan 73 to generate force to induce flow of air in the clothing dryer 10. Air discharged by the blowing fan 73 is discharged to the outside through the exhaust pipe 76 having one end connected to a fan casing 79 of the blowing fan 73 and the other end extending out of the housing 20. In the exhaust pipe 76 is mounted an exhaust temperature sensor 77 to sense temperature of the air discharged from the outlet of the drum 30 after drying clothing, i.e., exhaust temperature.

Below the drum 30 is mounted a motor 80 to simultaneously drive the blowing fan 73 and the drum 30. The motor 80 has a drive shaft extending back and forth. One end of the drive shaft is connected to the blowing fan 73, and the other end of the drive shaft is connected to a pulley 83 to drive the drum 30. The pulley 83 and the drum 30 are connected to each other via a belt 86 such that the drum 30 is rotated when the motor 80 is driven.

At the upper part of the rear bracket 33, mounted at the rear of the drum 30, are formed intake ports 34 to suction hot air. At the rear of the rear bracket 33 is mounted an intake duct 35 to guide the hot air to the intake ports 34. The intake duct 35 extends rearward from below the drum 30 and is bent upward to communicate with the intake ports 34. At the inlet of the intake duct 35 are mounted first and second hot air heaters 36 and 38 to heat air suctioned from the interior of the housing 20. At the outlet of the intake duct 35 is mounted a heater temperature sensor 39 to sense temperature of the air having passed through the first and second hot air heaters 36 and 38.

The first and second hot air heaters 36 and 38 have different power capacities. For example, when a total power capacity (M+N: 100%) is 5.3 kW, the first hot air heater 36 has a relatively large power capacity M of approximately 3.7 kW (70%), and the second hot air heater 38 has a relatively small power capacity N of approximately 1.6 kW (30%). The power capacities of the first and second hot air heaters 36 and 38 may not have a ratio of 70:30. Various ratios of the power capacities may be provided to reduce power consumption to more than a predetermined level (approximately 5%) while securing a predetermined drying time (approximately 25 minutes but less than 30 minutes). Generally, the second hot air heater 38 has a variable power capacity N of approximately 1 to 2 kW.

In this embodiment, the clothing dryer is of an exhaust type although the clothing dryer may be of a condensing type.

Figure 2:
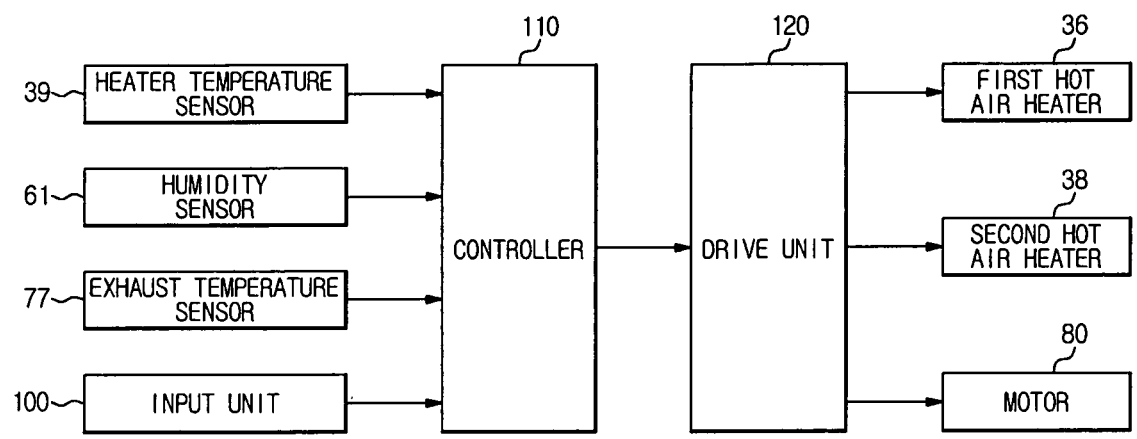
FIG. 2 is a control configuration diagram of the clothing dryer according to the embodiment.

FIG. 2 is a control configuration diagram of the clothing dryer according to the embodiment of the present invention. The clothing dryer includes an input unit 100, a controller 110 and a drive unit 120.

The input unit 100 allows a user to input operation information, such as a drying course, drying time, and an operation command, to the controller 110.

The controller 110 is a microprocessor to control overall operations of the clothing dryer according to the operation information input from the input unit 100. The controller 110 calculates a humidity change amount (a humidity change rate per predetermined time: a drying rate) based on internal humidity of the drum 30 sensed by the humidity sensor 61 and divides a drying period into several periods based on the calculated humidity change amount (the drying rate) to control a drying operation.

That is, the controller 110 divides the drying period into a transient drying period, a constant rate drying period and a falling rate drying period based on the humidity change amount (the drying rate).

The transient drying period is an initial drying period in which clothing starts to be dried. In the transient drying period, temperature of air in the drum 30, the clothing and the surroundings of the clothing is increased such that hot air heated by the first and second hot air heaters 36 and 38 easily evaporates moisture from the surface of the clothing.

The constant rate drying period is a period in which main drying is performed. In the constant rate drying period, the hot air heated by the first and second hot air heaters 36 and 38 is used to dry the moisture contained in the clothing. Therefore, the temperature of the air at the outlet of the drum 30, i.e., the temperature of the exhaust air, has a constant temperature distribution.

The falling rate drying period is a period corresponding to a second half of a drying period in which drying is ended. In the falling rate drying period, less moisture is contained in the clothing than in the constant rate drying period, with the result that the hot air heated by the first and second hot air heaters 36 and 38 is used to dry the air in the drum 30. Therefore, the temperature of the air at the outlet of the drum 30, i.e., the temperature of exhaust air, has a suddenly rising temperature distribution.

Also, the controller 110 controls only the second hot air heater 38 having the relatively small capacity to be operated, such that the internal temperature of the drum 30 is not excessively increased, at a point where the internal humidity of the drum 30 is suddenly decreased in the falling rate drying period corresponding to the second half of the drying period. More specifically, upon determining that the humidity change amount in the drum 30 is greater than a predetermined change amount as the result of the comparison therebetween, the controller 110 determines that the period at that time is a quasi-falling rate drying period in which the internal humidity of the drum 30 starts to suddenly decrease and controls only the second hot air heater 38 having the relatively small capacity to be operated. When the second hot air heater 38 alone is operated, the clothing containing little moisture is sufficiently dried, and the internal temperature of the drum 30 is maintained at a predetermined level or less. Consequently, the first and second hot air heaters 36 and 38 may not be frequently turned on/off. The operation of the second hot air heater 38 alone is continued until the drying is ended.

The drive unit 120 operates the first and second hot air heaters 36 and 38 and the motor 80 according to a drive control signal from the controller 110.

Figure 3:
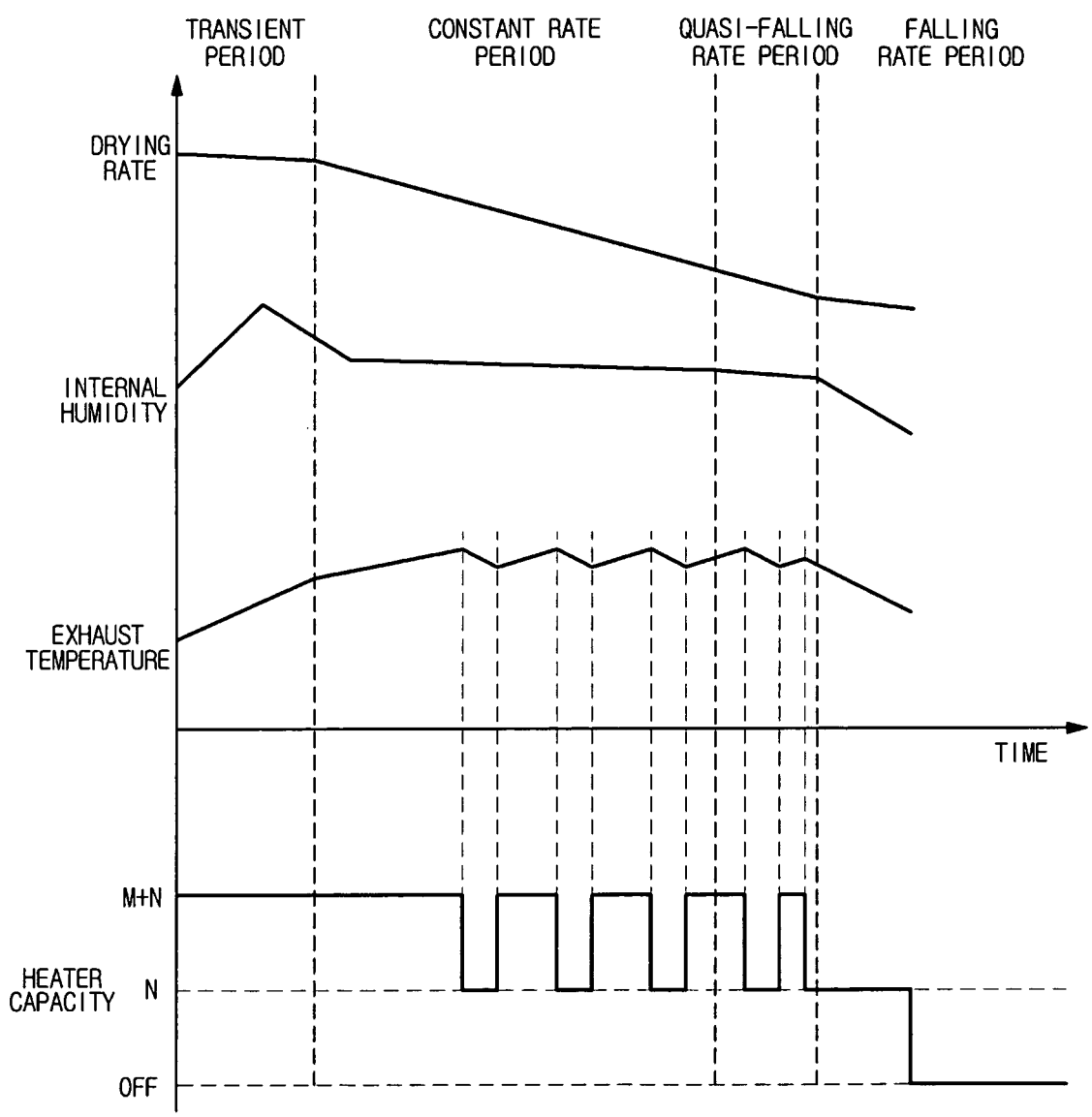
FIG. 3 is a graph illustrating a first profile of heater control based on internal humidity of a drum and exhaust temperature during a drying operation of the clothing dryer according to the embodiment.
Figure 4:
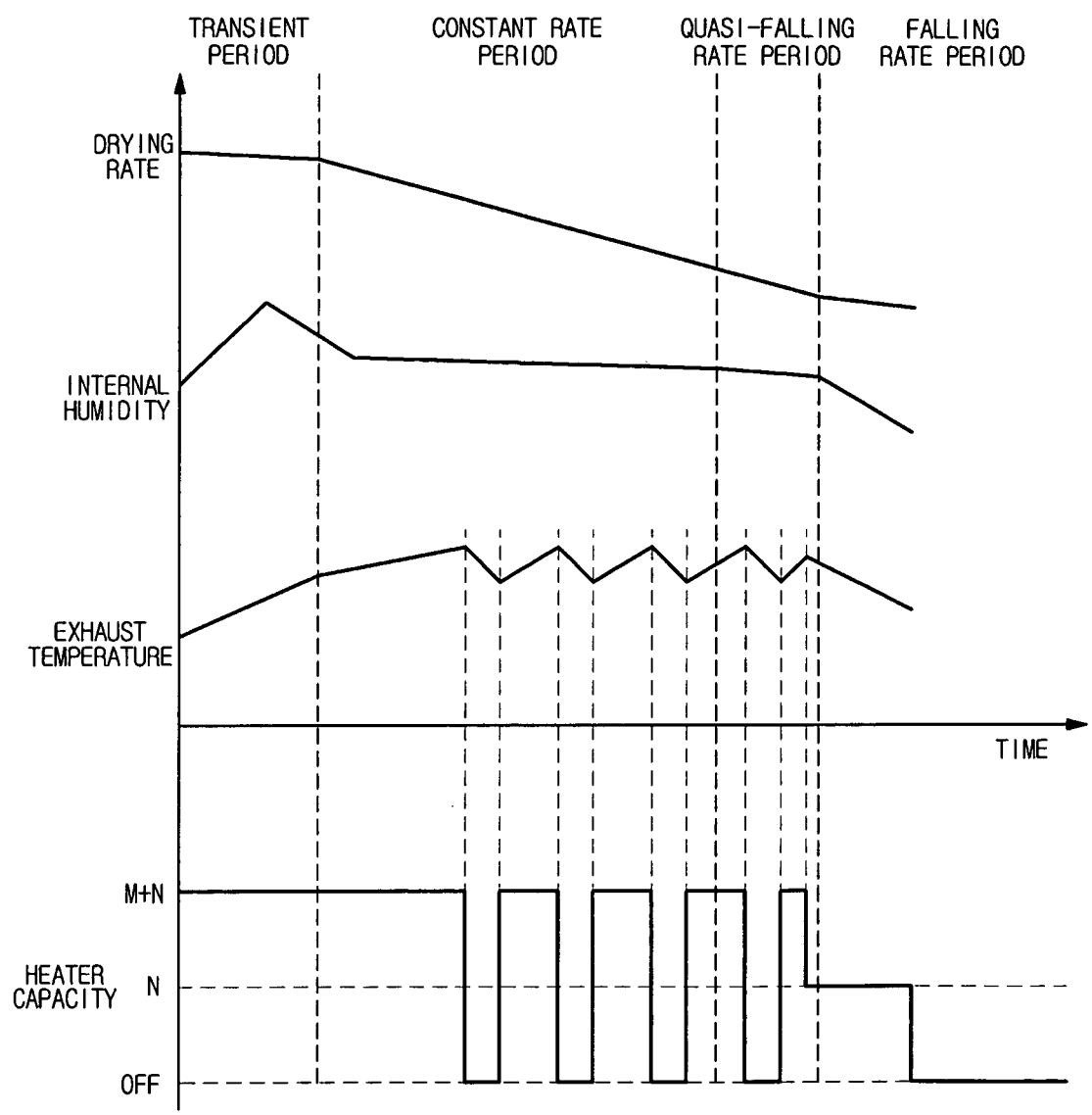
FIG. 4 is a graph illustrating a second profile of heater control based on internal humidity of the drum and exhaust temperature during a drying operation of the clothing dryer according to the embodiment.
Figure 5:
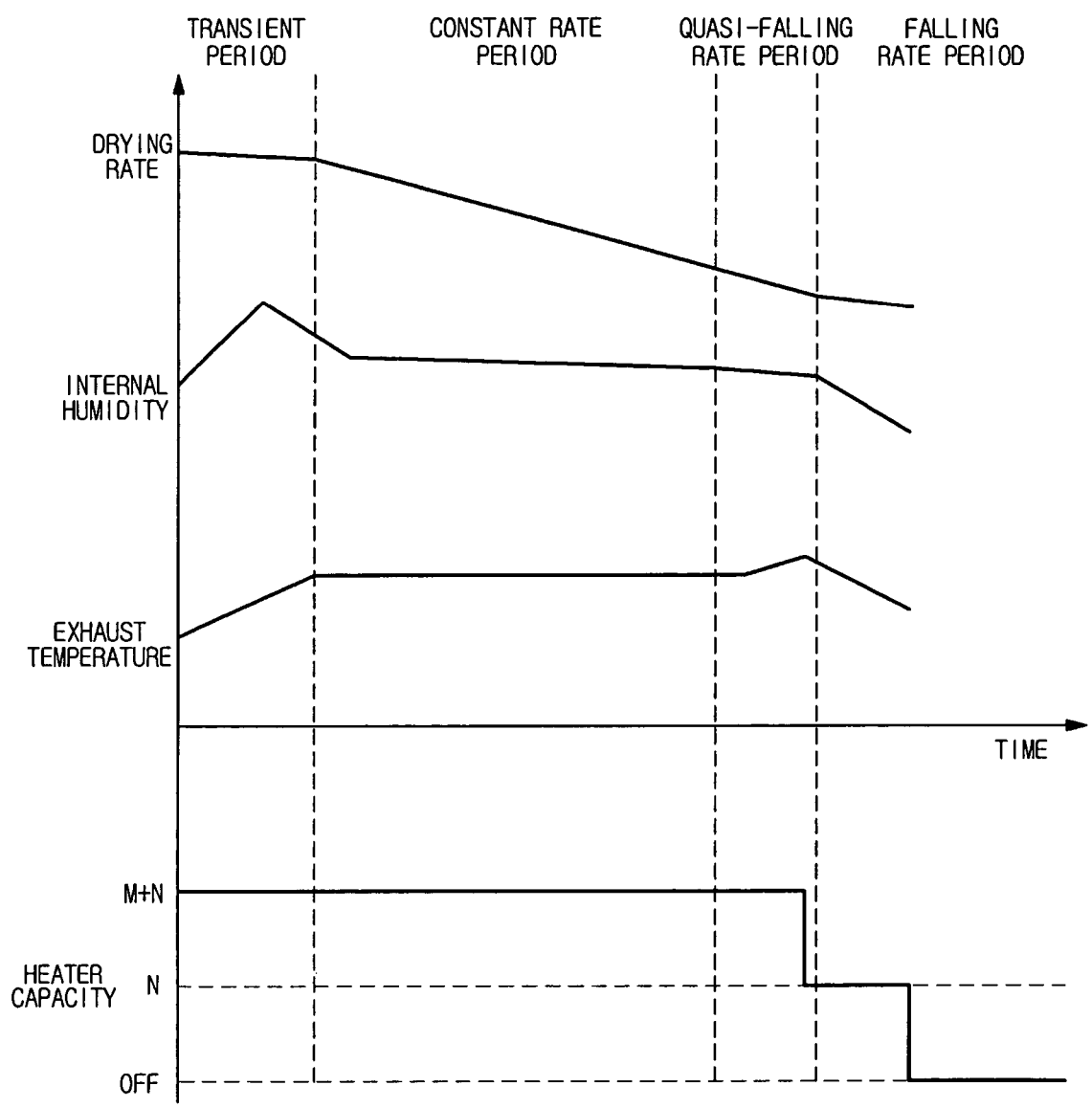
FIG. 5 is a graph illustrating a third profile of heater control based on internal humidity of the drum and exhaust temperature during a drying operation of the clothing dryer according to the embodiment.

Relations between the internal humidity of the drum 30 and the control of the first and second hot air heaters 36 and 38 in the divided drying periods are shown in FIGS. 3 to 5.

FIG. 3 is a graph illustrating a first profile of heater control based on internal humidity of the drum and exhaust temperature during a drying operation of the clothing dryer according to the embodiment of the present invention.

As shown in FIG. 3, the controller 110 controls both the first and second hot air heaters 36 and 38 to be operated with the maximum heater capacity (M+N: 100%) in the transient drying period (approximately 5 minutes or less) in which clothing starts to be dried to increase temperature of air in the drum 30, the clothing and the surroundings of the clothing such that the clothing dryer 10 reaches an optimized drying state within a short time.

Subsequently, the controller 110 controls the first hot air heater 36 having the relatively large capacity M to be turned on/off according to the temperature of the exhaust air, i.e., exhaust temperature having a control temperature period set to uniformly maintain the exhaust air, and the second hot air heater 38 having the relatively small capacity N to be continuously on in the constant rate drying period in which main drying is performed such that the moisture contained in the clothing is removed within a short time. At this time, the humidity change amount (the drying rate) is uniformly maintained.

When the moisture contained in the clothing in the drum 30 is almost completely removed as the result of the drying operation in the constant rate drying period, the temperature of the air discharged from the outlet of the drum 30 after drying the clothing, i.e., the exhaust temperature, is suddenly increased, with the result that the internal humidity of the drum 30 is suddenly decreased. At this time, the humidity change amount is also decreased. Upon determining that the calculated humidity change amount is greater than the predetermined change amount as the result of the comparison therebetween, the controller 110 determines the period at that time is the quasi-falling rate drying period and controls the first hot air heater 36 to be stopped. Upon determining that any control temperature period is the quasi-falling rate drying period, the controller 110 controls the first hot air heater 36 having the relatively large capacity M to be stopped.

When the heater control is performed, such that the first hot air heater 36 having the relatively large capacity M is stopped and the second hot air heater 38 having the relative small capacity N is operated, before the quasi-falling rate drying period, drying time exceeds 30 minutes, and, when the heater control is performed, such that the second hot air heater 38 alone is operated, after the quasi-falling rate drying period, a power consumption reduction rate is less than 5%, which is confirmed through experiments as shown in Table 1 below.

Therefore, when the heater control is performed, such that the first hot air heater 36 having the relatively large capacity M is stopped and the second hot air heater 38 having the relative small capacity N is operated, in the quasi-falling rate drying period, power consumption is reduced without great increase of drying time, as confirmed by Table 1 below.

TABLE 1

| Control time (min) | Yearly power consumption (kWh/year) | Drying time (min) | Power consumption reduction rate (%) | Drying time increment (%) |
|---|---|---|---|---|
| 15 | 854.0 | 38 | 8.7 | 53.8 |
| 17 | 856.0 | 33.9 | 8.4 | 37.2 |
| 18 | 857.7 | 31.9 | 8.3 | 29.1 |
| 20 | 867.1 | 28.9 | 7.3 | 17.0 |
| 22 | 882.3 | 26 | 5.6 | 5.3 |
| 23 | 896.7 | 25.5 | 4.1 | 3.2 |

* Fundamental yearly power consumption: 935, drying time: 24.7

In the state in which the first hot air heater 36 is stopped in the quasi-falling rate drying period, the controller 110 controls the second hot air heater 38 alone to be operated in the falling rate drying period (from approximately 22 minutes to the point of time at which drying is ended) corresponding to the second half of the drying period. Consequently, the drying of the clothing containing little moisture is completed using the relatively small heater capacity N, with the result that the internal temperature of the drum 30 is prevented from being excessively increased.

FIG. 4 is a graph illustrating a second profile of heater control based on internal humidity of the drum and exhaust temperature during a drying operation of the clothing dryer according to the embodiment of the present invention. A repetitive description of the same portion as in FIG. 3 is omitted.

As shown in FIG. 4, the controller 110 controls both the first and second hot air heaters 36 and 38 to be operated with the maximum heater capacity (M+N: 100%) in the transient drying period such that the clothing dryer 10 reaches an optimized drying state within a short time.

Subsequently, the controller 110 controls both the first and second hot air heaters 36 and 38 to be turned on/off according to the temperature of the exhaust air, i.e., exhaust temperature having a control temperature period set to uniformly maintain the exhaust air, in the constant rate drying period in which main drying is performed such that the moisture contained in the clothing is removed within a short time. At this time, the humidity change amount (the drying rate) is uniformly maintained.

When the moisture contained in the clothing in the drum 30 is almost completely removed as the result of the drying operation in the constant rate drying period, the humidity change amount is suddenly decreased. Upon determining that the humidity change amount is greater than the predetermined change amount, the controller 110 determines that the period at that time is the quasi-falling rate drying period and controls the first hot air heater 36 to be stopped.

When the heater control is performed, such that the first hot air heater 36 having the relatively large capacity M is stopped and the second hot air heater 38 having the relative small capacity N is operated, in the quasi-falling rate drying period, power consumption is reduced without great increase of drying time, as confirmed by Table 1 above.

FIG. 5 is a graph illustrating a third profile of heater control based on internal humidity of the drum and exhaust temperature during a drying operation of the clothing dryer according to the embodiment of the present invention. A repetitive description of the same portion as in FIGS. 3 and 4 is omitted.

As shown in FIG. 5, the controller 110 controls both the first and second hot air heaters 36 and 38 to be operated with the maximum heater capacity (M+N: 100%) in the transient drying period such that the clothing dryer 10 reaches an optimized drying state within a short time.

Subsequently, the controller 110 controls both the first and second hot air heaters 36 and 38 to be operated with the maximum heater capacity (M+N: 100%) in the constant rate drying period in which main drying is performed such that the moisture contained in the clothing is removed within a short time. At this time, the humidity change amount (the drying rate) is uniformly maintained.

When the moisture contained in the clothing in the drum 30 is almost removed as the result of the drying operation in the constant rate drying period, the humidity change amount is suddenly decreased. Upon determining that the humidity change amount is greater than the predetermined change amount, the controller 110 determines that the period at that time is the quasi-falling rate drying period and controls the first hot air heater 36 to be stopped.

When the heater control is performed, such that the first hot air heater 36 having the relatively large capacity M is stopped and the second hot air heater 38 having the relative small capacity N is operated, in the quasi-falling rate drying period, power consumption is reduced without great increase of drying time, as confirmed by Table 1 above.

Hereinafter, the operation of the clothing dryer according to the embodiment will be described.

Figure 6:
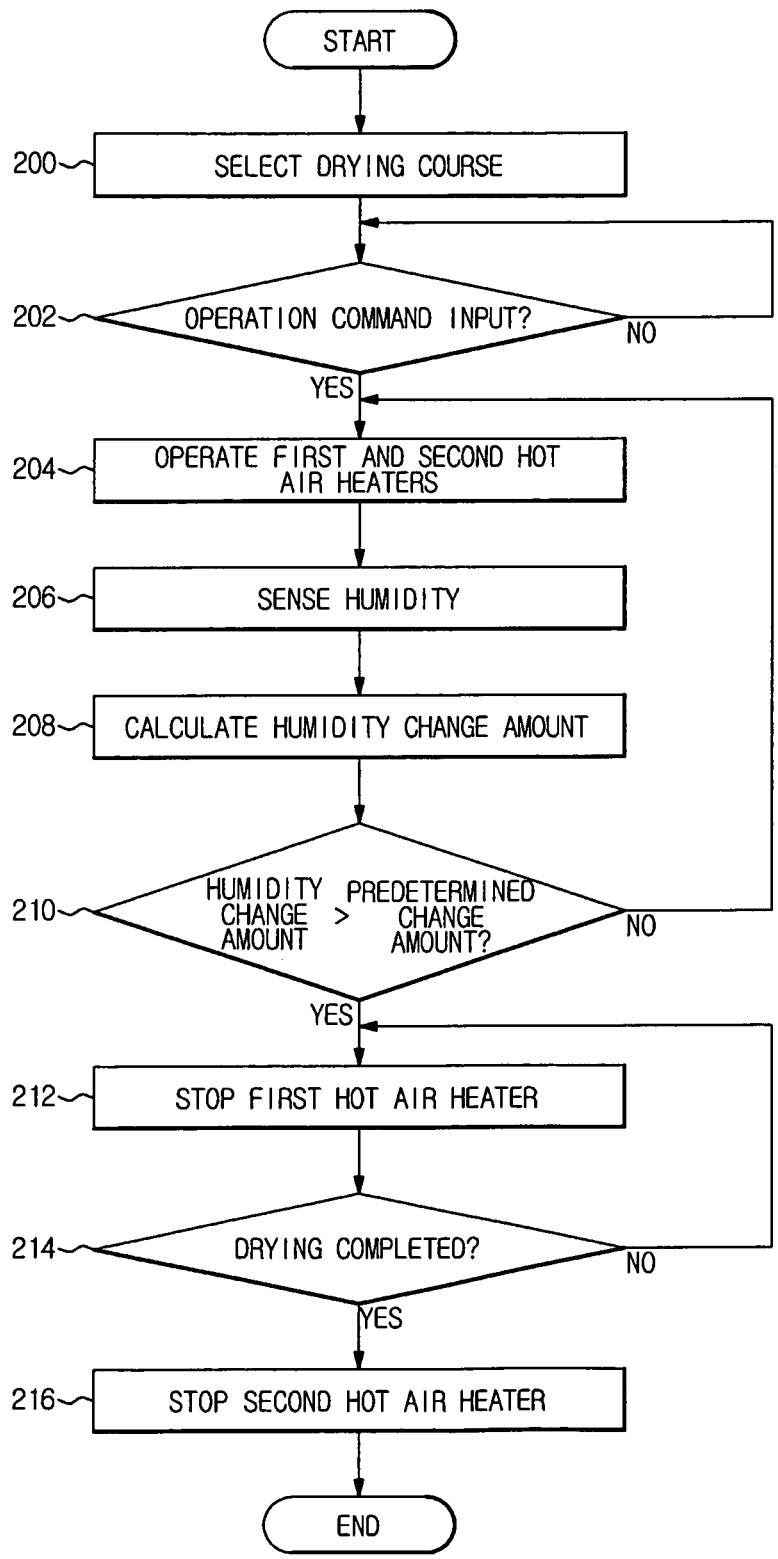
FIG. 6 is a flow chart illustrating a control method of the clothing dryer according to an embodiment.

FIG. 6 is a flow chart illustrating a control method of the clothing dryer according to an embodiment.

When a user puts clothing to be dried in the drum 30 and selects a drying course according to kinds of the clothing (200), operation information selected by the user is input to the controller 110 through the input unit 100.

The controller 110 controls drying to be performed according to the operation information input through the input unit 100. First, the controller determines whether an operation command has been input (202).

Upon determining at Operation 202 that the operation command has been input, the controller 110 drives the motor 80 through the drive unit 120 and controls the first and second hot air heaters 36 and 38 to be operated according to the control profiles shown in FIGS. 3 to 5 (204).

The drum 30 is rotated to rotate the clothing in the drum 30 according to the driving of the motor 80. The blowing fan 73 is also rotated according to the driving of the motor 80. As a result, air starts to flow in the clothing dryer 10.

At this time, the first and second hot air heaters 36 and 38 are operated to heat the air flowing in the clothing dryer 10 into hot air according to the control profiles shown in FIGS. 3 to 5. The hot air is supplied into the drum 30 through the intake duct 35. The hot air supplied into the drum 30 contacts the clothing rotated in the drum 30 while being repeatedly raised and lowered to dry the clothing through a drying operation to evaporate moisture contained in the clothing.

Internal humidity of the drum 30 is decreased by the drying operation. At this time, the internal humidity of the drum 30 is sensed by the humidity sensor 61. The sensed internal humidity of the drum 30 is input to the controller 110 (206).

The controller 110 calculates a humidity change amount based on the internal humidity of the drum 30 sensed by the humidity sensor 61 (208).

In the transient drying period in which the clothing starts to be dried, heat energy generated from the first and second hot air heaters 36 and 38 is used to increase temperature of air in the drum 30, the clothing and the surroundings of the clothing although both the first and second hot air heaters 36 and 38 are operated with the maximum heater capacity (100%), with the result that a drying rate is small.

On the other hand, in the constant rate drying period in which main drying is performed, the heat energy generated from the first and second hot air heaters 36 and 38 is used to evaporate moisture contained in the clothing, with the result that the drying rate is uniform.

In this way, the heat energy generated from the first and second hot air heaters 36 and 38 is used to evaporate the moisture contained in the clothing in the constant rate drying period, with the result that the temperature of exhaust air having passed through the drum 30 is not suddenly increased by latent heat, and the humidity change amount is not also suddenly decreased.

When the moisture contained in the clothing is almost removed, however, the temperature of the exhaust air having passed through the drum 30 is suddenly increased, and the humidity change amount is also suddenly decreased.

Consequently, the controller 110 compares the calculated humidity change amount with a predetermined change amount (a humidity change amount in a predetermined percentage zone in which internal humidity of the drum is suddenly decreased) (210). Upon determining that the humidity change amount is not greater than the predetermined change amount, the procedure returns to Operation 204 where subsequent operations are performed.

Upon determining at Operation 210 that the humidity change amount is greater than the predetermined change amount, the controller determines that the period at that time is the quasi-falling rate drying period in which the internal humidity of the drum 30 is suddenly decreased and stops the operation of the first hot air heater 36 through the drive unit 120 (212).

Consequently, the second hot air heater 38 alone is operated in a subsequent drying period. Since little moisture is present in the clothing at this time, the drying operation is performed with even the small capacity of the second hot air heater 38, with the result that power consumption is reduced. Also, the first and second hot air heaters 36 and 38 are not frequently turned on/off, with the result that the internal temperature of the drum 30 is uniformly maintained, thereby improving drying quality of the clothing.

Subsequently, the controller 110 determines whether a drying completion condition has been satisfied (214). Upon determining that the drying completion condition has not been satisfied, the procedure returns to Operation 210 where subsequent operations are performed.

Upon determining at Operation 214 that that the drying completion condition has been satisfied, the controller 110 stops the operation of the second hot air heater 38 through the drive unit 120 to complete the drying operation (216). The drying completion condition may be set as follows. The humidity sensor 61 contacts the clothing rotated according to the rotation of the drum 30 to generate an electric signal according to the amount of moisture contained in the clothing, based on which dryness of the clothing is determined.

In this embodiment, the determination of the quasi-falling rate drying period using the humidity change amount in the drum 30 has been described as an example. However, embodiments of the present invention are not limited thereto. For example, the determination of the quasi-falling rate drying period using an increase rate in temperature of air discharged from the outlet of the drum 30 after drying the clothing, i.e., exhaust air may achieve the same effects.

As is apparent from the above description, the operation of the heaters having different capacities is controlled to adjust heater capacity based on the humidity change amount (the drying rate), thereby reducing power consumption.

Also, only the heater having the relatively small capacity is operated in the period in which the internal humidity of the drum is suddenly decreased, thereby reducing power consumption without great increase of drying time.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A clothing dryer comprising:

a drum to receive clothing;

a first hot air heater and a second hot air heater to supply hot air into the drum, the second hot air heater having a relatively smaller heater capacity compared to the first hot air heater;

a humidity sensor to sense internal humidity of the drum; and a controller to calculate a humidity change amount in the drum, to compare the calculated humidity change amount with a predetermined change amount, and to control the second hot air heater to be operated and the first hot air heater not to be operated so as to adjust a heater capacity in a part of a drying period when the humidity change amount is greater than the predetermined change amount;

a temperature sensor to sense exhaust temperature at an outlet of the drum, wherein the controller controls the first and second hot air heaters to be selectively operated based on the exhaust temperature when the humidity change amount is not greater than the predetermined change amount.

2. The clothing dryer according to claim 1, wherein the controller controls both the first and second hot air heaters to be turned on/off based on the exhaust temperature.

3. The clothing dryer according to claim 1, wherein the controller controls one of the first and second hot air heaters to be turned on and the other of the first and second hot air heaters to be turned on/off based on the exhaust temperature.

\* \* \* \* \*